United States Patent [19]

Hodkinson et al.

[11] 4,442,924

[45] Apr. 17, 1984

[54] INTERNAL SHOE DRUM BRAKES

[75] Inventors: Harold Hodkinson, Coventry; William E. Haines, Southam, both of England

[73] Assignee: Automotive Products Limited, Leamington Spa, England

[21] Appl. No.: 511,001

[22] Filed: Jul. 6, 1983

Related U.S. Application Data

[63] Continuation of Ser. No. 314,868, Oct. 26, 1981, abandoned.

[30] Foreign Application Priority Data

Oct. 29, 1980 [GB] United Kingdom ............... 8034841

[51] Int. Cl.³ .................................. F16D 65/54
[52] U.S. Cl. ..................... 188/79.5 GT; 188/196 B; 188/196 D; 188/196 P; 188/326; 192/75; 192/111 A
[58] Field of Search ............... 188/79.5 GT, 79.5 SS, 188/79.5 GC, 196 P, 206 R, 325, 326, 343; 192/75, 107 T, 111 A

[56] References Cited

U.S. PATENT DOCUMENTS

| 2,244,084 | 6/1941 | Saenger | 188/79.5 GT |
| 2,386,913 | 10/1945 | Sawtelle | 188/79.5 GT |
| 2,619,198 | 4/1952 | Freund | 188/79.5 GT |
| 2,670,058 | 2/1954 | Landrum | 188/79.5 GT |
| 2,871,990 | 2/1959 | Barnett | 188/79.5 GT X |
| 2,984,319 | 5/1961 | Butter | 188/196 P X |

FOREIGN PATENT DOCUMENTS

| 807998 | 3/1969 | Canada | 188/196 P |
| 2606757 | 9/1977 | Fed. Rep. of Germany | 188/79.5 GT |
| 1513740 | 6/1978 | United Kingdom . | |

Primary Examiner—George E. A. Halvosa
Attorney, Agent, or Firm—Kemon & Estabrook

[57] ABSTRACT

An internal shoe drum brake having a pair of brake shoes mounted on a back plate with double ended expanders located one between each pair of adjacent ends of the shoes. The expander has a strut assembly slidable within itself so that when the expander is operated the strut assembly transmits braking loads from one shoe to the other so that the brake operates in a duo servo mode. With the expanders arranged to operate vertically the weight of the shoes and acts against the strut assembly. In order to support the upper brake shoe and prevent the shoes moving off-center a variable length support acts between the upper shoe and the wheel cylinder. The support has a spring therein so that the support can resiliently collapse when the sheos move during duo servo braking.

5 Claims, 5 Drawing Figures

INTERNAL SHOE DRUM BRAKES

This application is a continuation of application Ser. No. 314,868, filed Oct. 26, 1981, now abandoned.

This invention relates to internal shoe drum brakes having a pair of brake shoes with a double ended expander means located between each pair of adjacent end of the two shoes, and in which one of the expander means has a strut assembly therein so that braking loads from one shoe are transmitted to the other shoe, i.e. the drum brake acts as a duo servo brake in this mode. The invention is particularly relevant to drum brakes in which the expander means with a strut assembly therein is a double ended hydraulic wheel cylinder which operates the brakes during service braking, but acts merely as a load transference strut during duo servo braking in the parking mode.

In a known drum brake, illustrated in British Pat. No. 1 513 740, a pair of brake shoes are arranged with an actuator located between each pair of adjacent ends, a mechanically operated actuator at one pair of ends and a hydraulic wheel cylinder at the other pair of ends. The arrangement is such that for service braking the hydraulic wheel cylinder operates in a leading/trailing mode with the brake shoes pivoting on the mechanical actuator which acts as a fixed abutment, and the mechanical actuator operates in a duo servo mode with the pistons in the wheel cylinder being linked to form a strut assembly which transmits the braking load from one brake shoe to the other.

This type of drum brake assembly can be orientated so that the double wheel cylinder is mounted on a back plate in such a manner that the bore of the cylinder is substantially vertical. The brake shoes are mounted, in this case, one shoe above the wheel cylinder and the other shoe below the cylinder. Since both shoes are interconnected by pull-off springs then the weight of the two shoes is received on the upper piston in the wheel cylinder, and there is a tendancy for the weight of the linked pistons in the wheel cylinder and the two shoes to move the pistons down through the bore. This results in the brake shoes becoming assymetrically located relative to the brake drum. Further it has been found that the normal shoe steady springs that each act against the brake shoe web to bias the shoe against the back plate, do not prevent this movement.

The present invention seeks to provide a solution to the above problem.

Accordingly there is provided an internal shoe drum brake having a pair of brake shoes mounted on a back plate with double ended expanders located one between each pair of adjacent ends of the shoes, one of said expanders having a strut assembly slidable therein to transmit braking loads from one brake shoe to the other and the operating axis of said expanders is substantially vertical so that the weight of the brake shoes acts against the upper end of said strut assembly characterised in that there is provided a variable length support acting between a position fixed relative to the back plate and the upper shoe near to said one expander capable of resiliently collapsing under a braking load but tending to maintain the upper brake shoe in a fixed datum position relative to the brake drum.

Conveniently the one expander is a double ended hydraulic wheel cylinder.

Preferably the support connects the upper brake shoe web to a lug on the wheel cylinder, and comprises a strut connection to the upper shoe via a lost-motion means constituted by the strut loosely engaging in a clearance hole in the web of the upper shoe, a friction grip device connecting the strut to the lug and which allows the overall effective length of the strut to increase but not decrease, and a compression spring which biases the friction grip away from a location on the lug to maintain it in a constant datum position and which compresses to allow the support to shorten under a braking load.

The invention will be described by way of example and with reference to the accompanying drawings in which.

Figure 1:
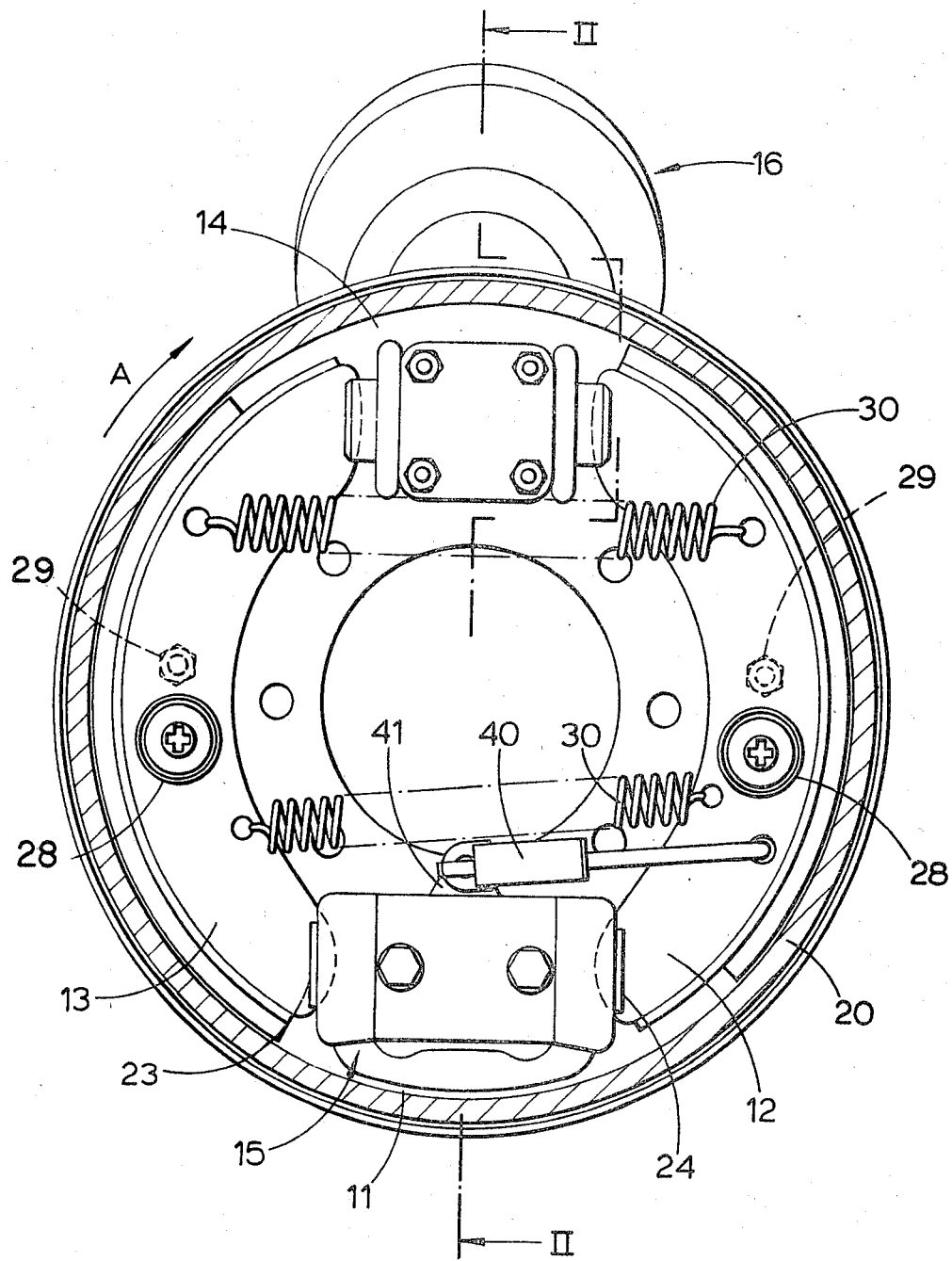
FIG. 1 shows an elevation of a drum brake assembly according to this invention.
Figure 2:
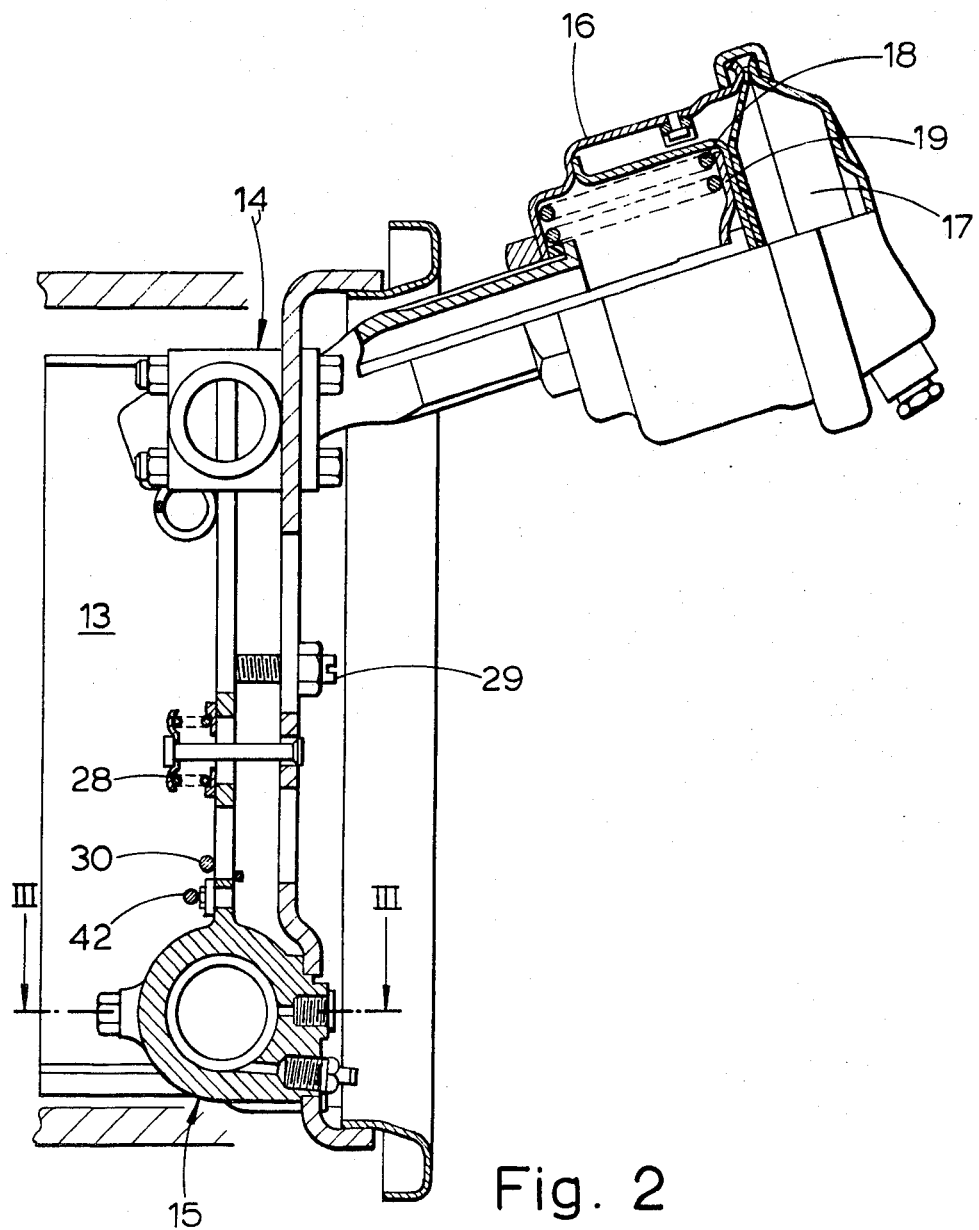
FIG. 2 is a section on the line II—II of FIG. 1.
Figure 3:
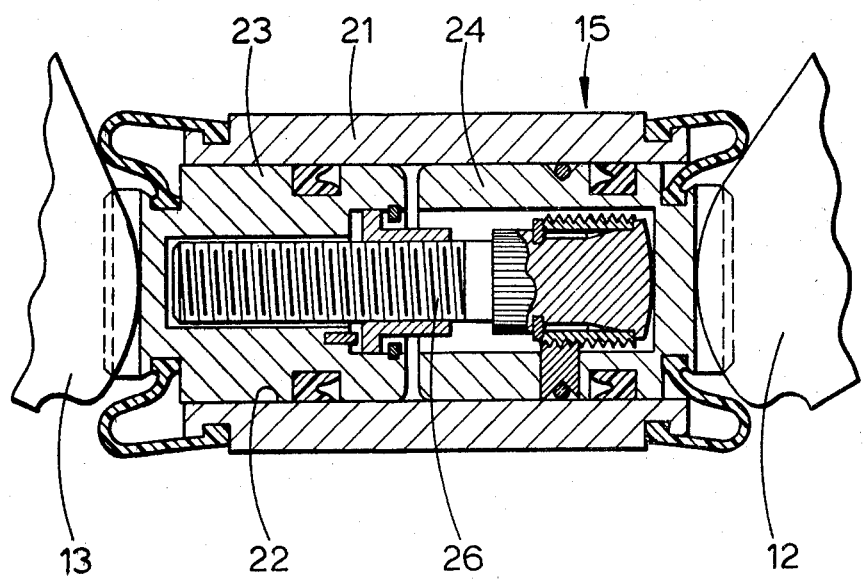
FIG. 3 is a section through the hydraulic wheel cylinder utilised in FIG. 1.

With reference to FIGS. 1 to 3 of the drawing, an internal shoe drum brake comprises a back plate 11 having a pair of brake shoes 12 and 13 mounted thereon. A mechanically operated expander 14 is located between one pair of adjacent ends of the brake shoes, and a hydraulically operated wheel cylinder 15 is located between the other pair of adjacent ends.

The mechanically operated expander 14 comprises a wedge member (not shown) which is pulled between a pair of opposed tappets (not shown) by a spring actuator 16 to apply the brakes. The spring actuator 16 is operated by compressed air pressure so that when there is a higher air pressure in the pressure chamber 17 the brakes are held off, but when the air pressure is low a spring 18 moves a piston 19 away from the back plate 11 to pull the wedge and thereby move the opposed tappets apart to apply the brake shoes. The mechanically operated expander is normally utilised as a parking brake actuator. The tappets are shouldered for abutment with the expander body and act as abutments for the brake shoes.

The hydraulically operated wheel cylinder 15 is described in our published British Patent Specification No. 1 513 740, and comprises a body 21 with a bore 22 therein having a pair of opposed pistons 23 and 24 therein. The pistons 23 and 24 are pushed apart by hydraulic pressure to apply the brakes and have a co-axial adjuster 26 located therein that serves to limit the return movement of the pistons 23 and 24 when the brakes are released. The adjuster 26 also serves as a strut assembly to transmit loads from one piston to the other. The workings of the adjuster form no part of this invention but are fully described in the above-mentioned specification.

The drum brake is assembled on the brake shoe back plate 11 in such a manner that the hydraulic wheel cylinder 15 is orientated so that its bore 22 is substantially vertical. Brake shoes 12 and 13 are mounted on the back plate 11 and the upper and lower shoes 12 and 13 respectively are interconnected by two return springs 30 which pull the shoes against the opposed pistons of the wheel cylinder 15 and the expander 14. The brake shoes 12 and 13 are each held in place in the back plate by a steady spring 28 and are each prevented from tipping by an adjustable shoe steady 29.

When the brakes are not in use one pair of adjacent ends of the brake shoes 11 and 12 rests against the mechanical expander 14 which acts as a fixed abutment on the back plate 11. The other pair of adjacent ends of the brake shoes rests on the pistons 23 and 24 of the wheel cylinder 15.

The weight of the two shoes bears against the upper piston 24, this tends to push both the upper piston 24 and lower piston 23 downwards in the bore 22 so that the brakes become off-centre relative to the brake drum 20.

Figure 4:
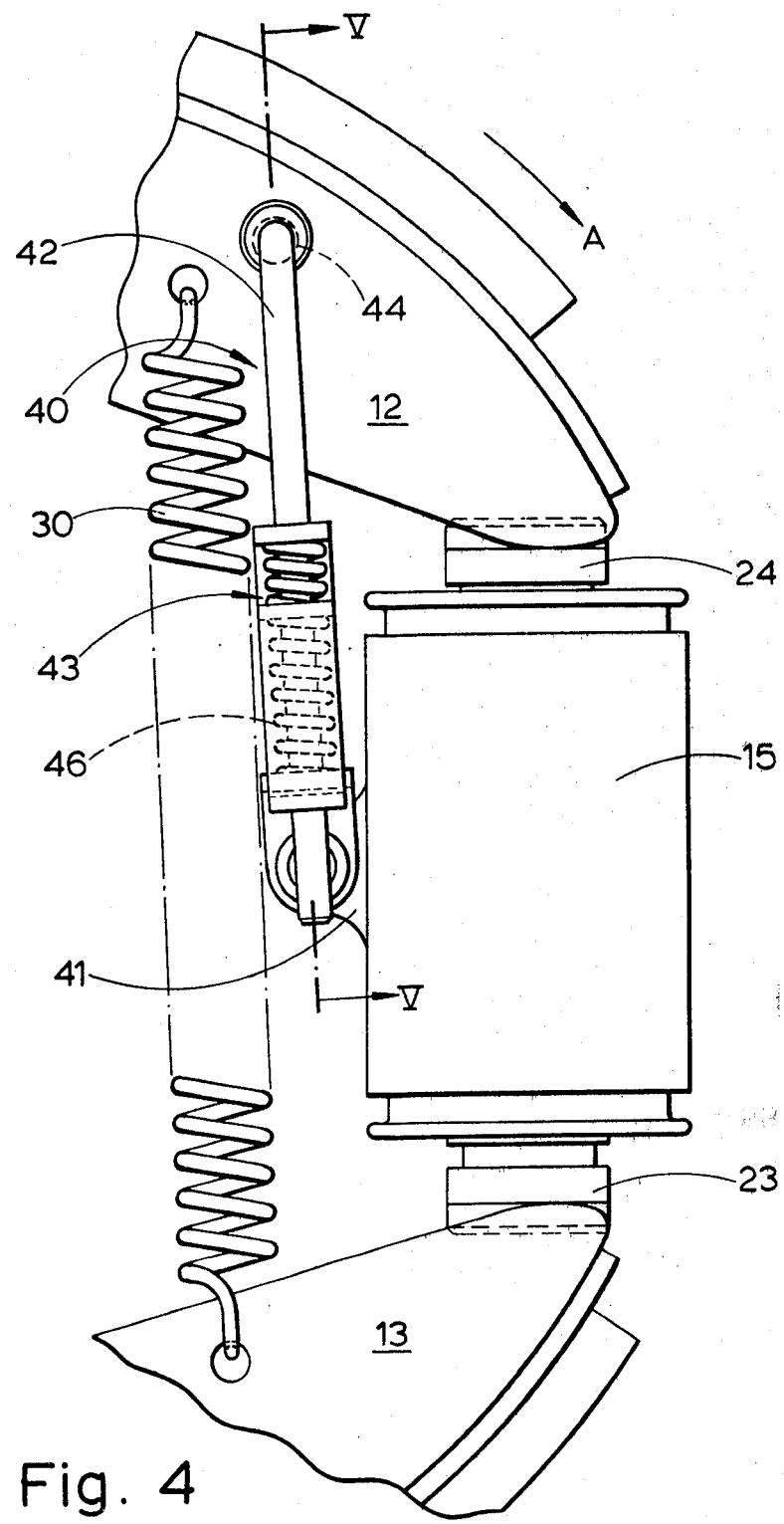
FIG. 4 is an enlarged elevation of the wheel cylinder and support of FIG. 1.
Figure 5:
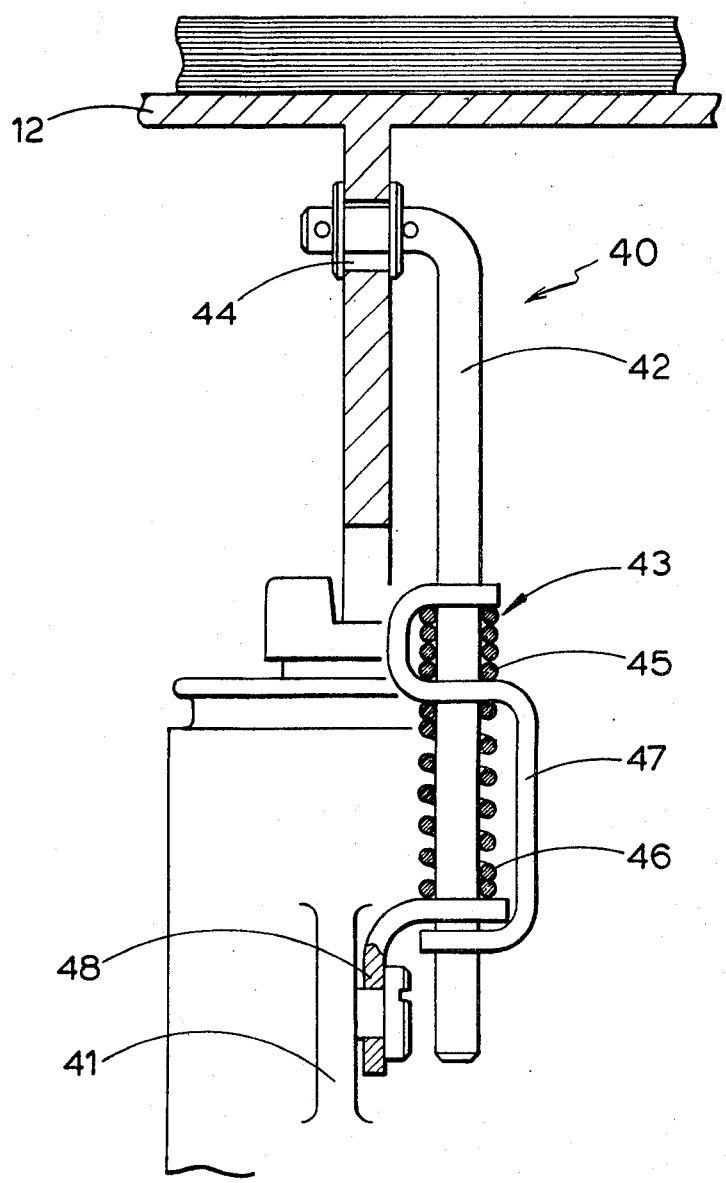
FIG. 5 is a section on the line V—V of FIG. 4.

Now with reference also to FIGS. 4 and 5, this downwards movement of the brake shoes 12 and 13 can be prevented by utilising a support means 40 to relieve the weight of the brake shoes on the upper piston 24. The support means 40 has one connection with a position fixed relative to the backplate, conveniently, to a lug 41 on the wheel cylinder 15, and another connection with the upper brake shoe 12. Alternatively the strut could be connected to the back plate 11 instead of the wheel cylinder. The support means 40 comprises a strut 42 connected to the upper shoe 12, a friction grip device 43 connected to the lug 41, and a compression spring 46. The strut 42 is connected to the upper shoe 12 via a lost motion means constituted by the strut 42 engaging in an oversize clearance hole 44 in the brake shoe. The clearance around the strut 42 is equal to one half of the total required clearance between the brake shoe linings and the brake drum. The friction grip device 43 is constituted by a coil spring 45 concentric with and closely fitting around the strut 42 and which allows the overall effective length of the support means to increase as the adjuster 26 in the wheel cylinder operates to maintain a constant clearance between the shoe 12 and the drum 20, but not to decrease.

When the mechanical expander 14 is operated, the brake functions in a duo-servo mode and the brake shoes 12 and 13 of the brake shoe assembly can float on the strut assembly 26 in the hydraulic cylinder 15. If the drum 20 is rotating in the direction of arrow A (clockwise) and the brakes applied by means of the mechanical expander, the braking load friction drag will tend to push the strut 42 downwards against the friction grip 43. If the load overcomes the friction grip this would shorten the effective length of the support and allow the brake shoe assembly to become off-centre relative to the drum.

In order to overcome this problem the friction grip device 43 floats on the spring 46 which biasses the friction grip device 43 away from the lug 41 to maintain it in an constant datum position with respect to the wheel cylinder. The spring 46 allows the strut 42 to move downwards when the shoes 12 and 13 are subject to the drag loads and then returns the strut 42 to its position after these loads cease. The spring 46 must exert a lesser load on the strut than the friction grip device 43 so that the spring 46 collapses before the strut 42 is pushed back through the spring 45 so as to shorten the effective length of the support means 40.

As can be seen in FIG. 5, the two springs 45 and 46 are arranged one in each bend of a 'S' shaped bracket 47 fitted onto the strut 42. The bracket 47 has one end portion engaging with a stop member 48 fixed to the lug 41. The spring 46 is concentric with the strut 42 and acts between the stop member 48 and the central bend portion in the bracket 47 to bias the bracket 48 towards the upper shoe 12. This upwards movement of the bracket 47 is limited by the one end of the bracket abutting the stop member 48. The friction grip spring 45 is arranged between the central portion and the other end portion of the bracket, the strut 42 being slidable in each of said portions.

I claim:
1. An internal shoe drum brake having:
   a drum;
   a back plate;
   a pair of brake shoes mounted on the back plate;
   a pair of double ended expanders each mounted on the back plate so that its operating axis is substantially vertical, said expanders each being located between adjacent ends of said shoes so that one of said shoes is above the expanders and the other of said shoes is below the expanders;
   adjustment means in one of said expanders for maintaining a constant shoe to drum clearance;
   a strut assembly located in one of said expanders and being slidable therein to transmit braking loads from one brake shoe to the other;
   return springs interconnecting the shoes to pull the shoes against the expanders; and
   a variable length support means having one connection with a position fixed relative to the back plate and another connection with the upper brake shoe near to said one of the expanders, said support means comprising a strut connected at one end to one of said connections, a friction grip device encircling the strut and having frictional engagement therewith, a stop member connected to the other of said connections, a bracket member having one end portion, another end portion and a central portion, each of said portions being slidable on the strut, a compression spring encircling the strut and arranged between said central portion and the stop member and biasing said one end portion against the stop member, the friction grip device being arranged between said central portion and said other end portion, the arrangement being such that the strut can move in one direction through the friction grip device to elongate said support means and allow the upper brake shoe to maintain a fixed shoe to drum clearance but under braking loads which tend to shorten said support means the compression spring collapses and the strut does not move in the other direction through the friction grip device.

2. The drum brake as claimed in claim 1 wherein said one expander is a double ended hydraulic wheel cylinder comprising a body and a lug thereon which acts as said position fixed relative to the back plate.

3. The drum brake as claimed in claim 1 wherein the friction grip means is a coil spring closely fitting around the strut.

4. The drum brake as claimed in claim 1 wherein one of said connections is a lost motion means.

5. The drum brake as claimed in claim 4 wherein the lost motion connection is constituted by the strut loosely engaging in a clearance hole in the upper brake shoe.

* * * * *